United States Patent [19]

Targetti

[11] Patent Number: 4,657,426
[45] Date of Patent: Apr. 14, 1987

[54] EXPANSION CLAMP FOR THE CONNECTION OF COINCIDING ENDS OF HOLLOW COMPONENTS OF RETICULAR STRUCTURES AND THE LIKE

[76] Inventor: Giampaolo Targetti, Florence, Italy

[21] Appl. No.: 846,893

[22] Filed: Apr. 1, 1986

[30] Foreign Application Priority Data

Aug. 7, 1985 [IT] Italy ................... 9473 A/85

[51] Int. Cl.⁴ .............................................. F16B 7/00
[52] U.S. Cl. ..................................... 403/297; 403/295
[58] Field of Search ................................ 403/295, 297

[56] References Cited
U.S. PATENT DOCUMENTS 2,290,430 7/1942 Heiser .................................. 403/297
3,709,533 1/1973 Walters ........................... 403/295 X
4,556,337 12/1985 Marshall ......................... 403/297 X

FOREIGN PATENT DOCUMENTS 1361398  4/1964 France ............................... 403/297
 737562  9/1955 United Kingdom ............... 403/297
1373571 11/1974 United Kingdom ............... 403/297

Primary Examiner—Andrew V. Kundrat
Attorney, Agent, or Firm—Hopgood, Calimafde, Kalil, Blaustein & Judlowe

[57] ABSTRACT

Between at least two stiff elements, that are shaped in correspondence to opposed inner wall surfaces of the end cavities of the components to be connected, elastic means are interposed in order to urge mutual separation between the elements; connecting means are provided on said elements, which means are constructed to cooperate with the components to be connected for securing against axial separation, and means are further provided that are constructed to assure between the two said elements a rigid arrangement of maximum separation after installation within the cavities of the abutting components.

6 Claims, 11 Drawing Figures

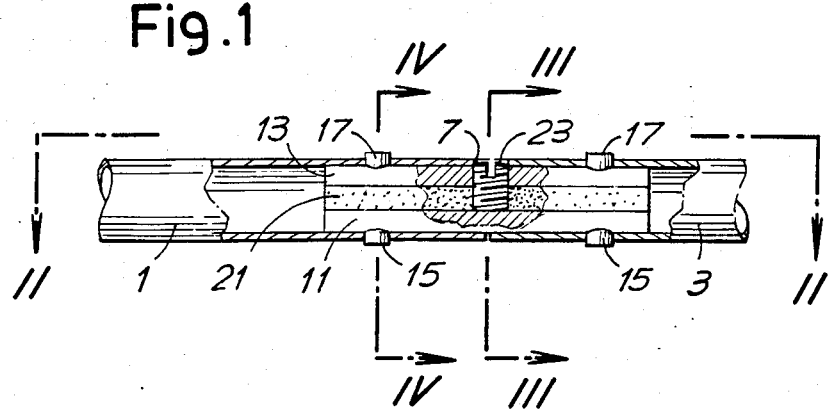
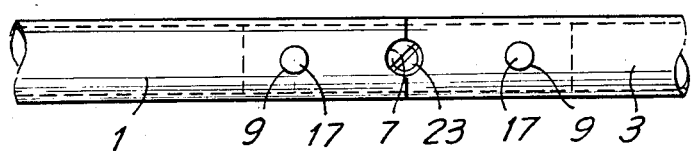
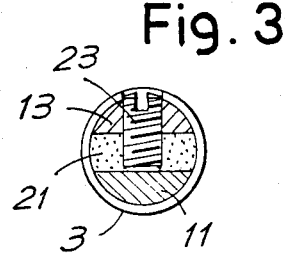
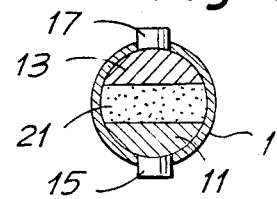
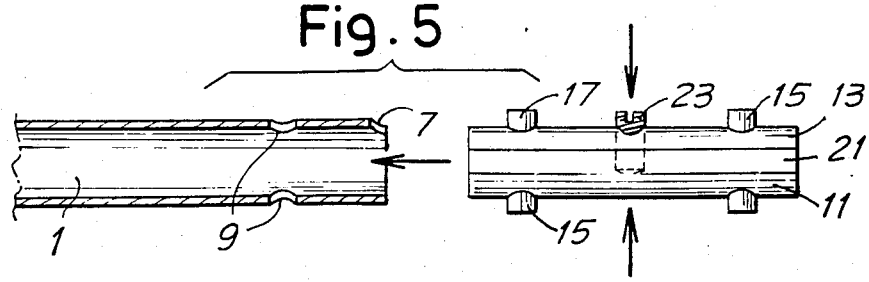

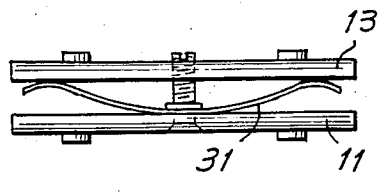
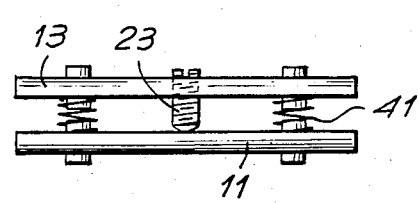
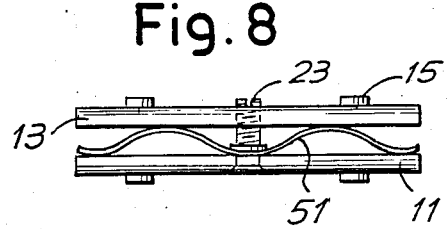
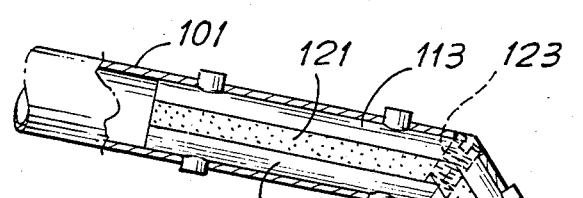
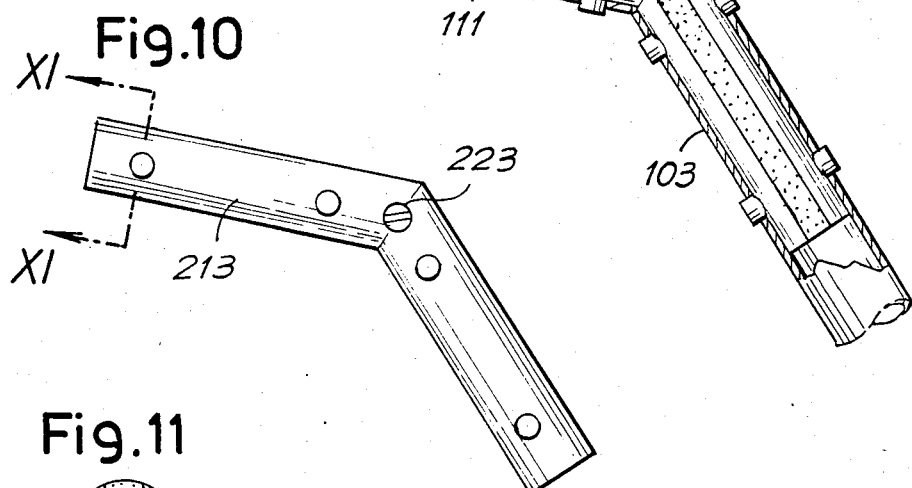
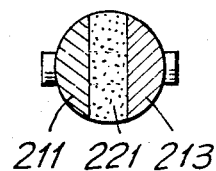

EXPANSION CLAMP FOR THE CONNECTION OF COINCIDING ENDS OF HOLLOW COMPONENTS OF RETICULAR STRUCTURES AND THE LIKE

DESCRIPTION

The invention relates to a device that is of use for carrying out the connection between abutting and coinciding ends of hollow and especially tubular components, for reticular structures and other applications; this device is suitable for assuring a very stable connection and also a continuity of the abutting components without any particular prominence but with a practically uniform development of the connection between the two components.

For this purpose the device, for the connection between coinciding ends of hollow and especially tubular components (for reticular structures or other), according to the invention, substantially includes: at least two stiff elements shaped in correspondence to the opposed portions of the inner wall surfaces of the components to be connected; elastic means interposed between said elements to cause resilient separation therebetween; on said elements connecting means for engaging the components to be connected to secure against axial separation, and means for assuring a rigid arrangement of maximum separation between the two said elements after installation inside the abutting components.

The connecting means may consist of stakes protruding from said elements constructed and arranged to be received in seats—such as through holes—of the components.

The means for assuring the rigid arrangement of maximum separation can be, in practice, screw means acting perpendicularly to the longitudinal axis of said elements. Such screw means can be placed at a central position on said elements, and can be received in opposed notches in the ends of the abutting elements.

Said elements can be either straight-line, for the connection of components whose ends are aligned, or angulated—or curved—for the connection between components wherein the ends to be connected are in angulated position or are curved.

The invention will be better understood by following the description and the appended drawings that show a practical non-limitative embodiment of the invention:

FIGS. 1, 2, 3 and 4 show a longitudinal section, a view from line II—II of FIG. 1 and sections along lines III—III and IV—IV of FIG. 1, to illustrate a clamp embodiment;

FIG. 5 shows a separate view of the clamp and the end of one of the components coinciding for the connection;

FIGS. 6, 7 and 8 show three modified embodiments of the clamp according to the invention;

FIGS. 9 and 10 show further possible embodiments; and

FIG. 11 shows a local section along line XI—XI of FIG. 10.

According to what is illustrated in the appended drawings, numerals 1 and 3 indicate respectively two components of a structure, which components are to be assembled coaxially abutting each one as a continuation of the other. Each component, such as that indicated by 1, has a tubular configuration and along the edge of the end, has a notch 7 and, at a given distance from the edge, a pair of opposite holes 9.

The clamp device according to the invention is made up of two stiff elements 11 and 13 longitudinally straight and with a cross section shaped as a circle segment as is apparent from the sections of FIGS. 3 and 4. Each one of these two elements has a couple of pegs or stakes indicated by 15 and 17, respectively, whose distance from each other is twice the distance between the holes 9 and the end of each tubular component 1 and 3. The two elements 11 and 13 are coupled to each other through an elastic member 21 interposed between them; this member, according to FIGS. 1 to 5, is developed as a shim or a layer of an elastomer such as rubber or other material having suitable characteristics. The two elements 11 and 13, through compression and crushing of the shim 21, can be brought together sufficiently to permit insertion of the ensemble (including stakes 15 and 17) in the inside of each end of the components 1 and 3, axially coinciding with each other. In this way the device 11, 13, 21 can be inserted in the axial hollows or cavities of the tubular components 1 and 3 to achieve abutting of the ends of the tubular components 1 and 3; the stakes 15 and 17, corresponding to each other in the transverse direction, find their seats in opposite holes 9 of each one of the two components 1 and 3. In this way the clamp device can expand radially to a limited extent owing to the elastic expansion of the shim 21, thus engaging the stakes 15 and 17 in the components 1 and 3 by means of the holes 9; the height of stakes 15 and 17 can be so limited that they do not protrude beyond the external surface of the components 1 and 3, although the entire thickness of the component defining the holes 9 is engaged. The two hollows or notches 7 of the abutting components 1 and 3 align with each other providing an access opening through which to manipulate a screw 23, that is engaged in one of the two elements, such as the element 13, centrally or at least at an intermediate position, which screw, by crossing the shim 21, can act by its inner end on the other of said elements, such as the element 11. When the screw 23 is drawn back from the element 11, compression of the shim 21 is permitted; after fitting the clamp device within the two coinciding and aligned components 1 and 3, the screw can be manipulated through the opening formed by the two notches 7, in order to be forced against the element 11, thus causing a forced expansion between the two elements 11 and 13 and then a rigid forcing of the two elements 11 and 13 against the internal walls of the components 1 and 3 in abutting disposition for securing the coupling. It is thus possible to establish a rigid connection in cooperation with the elastic coupling established by the shim 21, which always remains under some compression to cooperate in stabilizing the connection.

FIGS. 6, 7 and 8 show several modified embodiments, equivalent to the embodiment of FIGS. 1 to 5, wherein the elastic means that are interposed between the elements 11 and 13 are modified, these elastic means consisting, respectively, of a leaf spring 31, helical springs 41 (which can also find partial seats in depressions in the elements 11 and 13), and a corrugated spring 51.

In the embodiment of FIG. 9 two components 111 and 113 are provided, that are analogous to the elements 11 and 13, but that have an angular shape to permit coupling components 101 and 103 that converge towards each other at an angle. In this embodiment the elastic shim 121 (equivalent to the shim 21) is interposed between the two components 111 and 113, in contact with these components along surfaces that are perpendicular to the plane wherein the axes of each one of the components 101 and 103 are placed. In this case the forcing screw 123 (equivalent to screw 23) is placed with its axis corresponding to the bisector of the axes of the two components 101 and 103. As for the rest, the form and the function of the clamp are equal to what has been already illustrated.

In the embodiment of FIGS. 10 and 11 another arrangement is provided, according to which the two elements 211 and 213 are shaped to correspond to the angle between the two components to be coupled and the elastic shim 221, otherwise analogous to the shim 21 or 121, is interposed and in contact with surfaces of the elements 211 and 213 which lie on planes that are parallel to the plane containing the axes of the two components to be coupled. In this case the forcing screw 223 is placed with its axis perpendicular to said plane, which is defined by the axes of the two components. As for the rest, the shape and function are the same as that already described.

In any case a clamp device is obtained, which when installed is particularly stable, particularly simple to be mounted and which avoids prominences and bosses relative to the components that it couples; by this way a substantial aesthetical continuity between the various coupled components is assured.

It is to be understood that the drawing shows an example given only as a practical demonstration of the invention, the invention being capable of being varied in form and disposition without departing from the scope of the invention as defined in the appended claims.

I claim:

1. A device for interconnecting the ends of hollow components, including: at least two stiff elements that are shaped in correspondence to opposed portions of the inner wall surfaces of the components to be connected; elastic means interposed between said elements to cause resilient separation therebetween; on said elements connecting means for engaging the components to be connected to secure against axial separation; and means for assuring a rigid arrangement of maximum separation between the two said elements after installation inside the abutting components.

2. A device according to claim 1, wherein the connecting means consist of stakes protruding from said elements and constructed to be received by seats in the components.

3. A device according to claim 1, wherein the means for assuring a rigid arrangement of maximum separation are screw means acting perpendicularly to the longitudinal axes of said elements.

4. A device according to claim 3, wherein the screw means is disposed at a central position relative to the length of said elements for reception between opposed notches in the ends of said elements when said elements are connected.

5. A device according to claim 1, wherein said stiff elements are straight-line for the connection of components having straight ends aligned with each other.

6. A device according to claim 1, wherein said stiff elements are formed with a non straight longitudinal axis for connecting components wherein the ends to be connected provide a cavity with a similar non straight longitudinal axis.

* * * * *